United States Patent
Zhu et al.

(10) Patent No.: US 12,117,325 B2
(45) Date of Patent: Oct. 15, 2024

(54) MEASURING DEVICE AND METHOD FOR CHARACTERIZING A NON-HOMOGENEOUS, FLOWABLE MEDIUM

(71) Applicant: Endress+Hauser Flowtec AG, Reinach (CH)

(72) Inventors: Hao Zhu, Freising (DE); Alfred Rieder, Landshut (DE); Yaoying Lin, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 390 days.

(21) Appl. No.: 17/607,962

(22) PCT Filed: Mar. 31, 2020

(86) PCT No.: PCT/EP2020/059050
§ 371 (c)(1),
(2) Date: Nov. 1, 2021

(87) PCT Pub. No.: WO2020/221534
PCT Pub. Date: Nov. 5, 2020

(65) Prior Publication Data
US 2022/0291032 A1    Sep. 15, 2022

(30) Foreign Application Priority Data

Apr. 30, 2019   (DE) .................... 10 2019 003 075.3

(51) Int. Cl.
*G01F 1/84*   (2006.01)
*G01N 9/00*   (2006.01)
*G01N 11/16*  (2006.01)

(52) U.S. Cl.
CPC .......... *G01F 1/8436* (2013.01); *G01N 9/002* (2013.01); *G01N 11/16* (2013.01); *G01F 1/8477* (2013.01); *G01N 2009/006* (2013.01)

(58) Field of Classification Search
CPC ..... G01F 1/8436; G01F 1/8477; G01N 9/002; G01N 11/16; G01N 2009/006
See application file for complete search history.

(56) References Cited

U.S. PATENT DOCUMENTS

| | | | | |
|---|---|---|---|---|
| 5,295,084 A | * | 3/1994 | Arunachalam | G01F 15/024 702/50 |
| 5,497,666 A | * | 3/1996 | Patten | G01F 1/8472 73/861.355 |

(Continued)

FOREIGN PATENT DOCUMENTS

| | | |
|---|---|---|
| CN | 1166199 A | 11/1997 |
| CN | 1934425 A | 3/2007 |

(Continued)

*Primary Examiner* — Ryan D Walsh
(74) *Attorney, Agent, or Firm* — Kelly J. Smith; Endress+Hauser (USA) Holding, Inc.

(57) ABSTRACT

The disclosure relates to a measuring device for characterizing a non-homogeneous, flowable medium, and for determining the density, the mass flow rate and/or the viscosity of the medium measuring tube for guiding the medium. includes at least one mode of oscillation, the natural frequency of which depends on the density of the medium An exciter for exciting the mode of oscillation and an operation and evaluation circuit designed to apply an excitation signal to the exciter, to capture signals from the oscillation sensor, to determine current values of the natural frequency of the oscillator and fluctuations of the natural frequency on the basis of the signals from the oscillation sensor.

15 Claims, 1 Drawing Sheet

(56) References Cited

U.S. PATENT DOCUMENTS

| | | | |
|---|---|---|---|
| 5,594,180 | A | 1/1997 | Carpenter et al. |
| 8,151,653 | B2 | 4/2012 | Miyaji et al. |
| 9,395,236 | B2 | 7/2016 | McAnally et al. |
| 2010/0011882 | A1 | 1/2010 | Gebhardt et al. |
| 2010/0281998 | A1 | 11/2010 | Braun et al. |
| 2011/0011186 | A1 | 1/2011 | Miyaji et al. |
| 2011/0023626 | A1* | 2/2011 | Weinstein ............... G01F 15/02 137/15.01 |
| 2015/0226590 | A1 | 8/2015 | Huber et al. |
| 2016/0349091 | A1 | 12/2016 | Huber et al. |
| 2017/0356777 | A1* | 12/2017 | Zhu ...................... G01F 1/8436 |
| 2021/0223080 | A1* | 7/2021 | Zhu ...................... G01F 1/8431 |
| 2022/0334038 | A1* | 10/2022 | Zhu ........................ G01N 9/32 |

FOREIGN PATENT DOCUMENTS

| | | |
|---|---|---|
| CN | 101957222 A | 1/2011 |
| CN | 105899917 A | 8/2016 |
| DE | 102009000749 A1 | 8/2010 |
| DE | 102015104931 A1 | 6/2016 |
| DE | 102016114972 A1 | 2/2018 |
| JP | 200046617 A | 2/2000 |
| JP | 201189774 A | 5/2011 |
| WO | 2008136825 A1 | 11/2008 |
| WO | 2018001634 A1 | 1/2018 |

\* cited by examiner

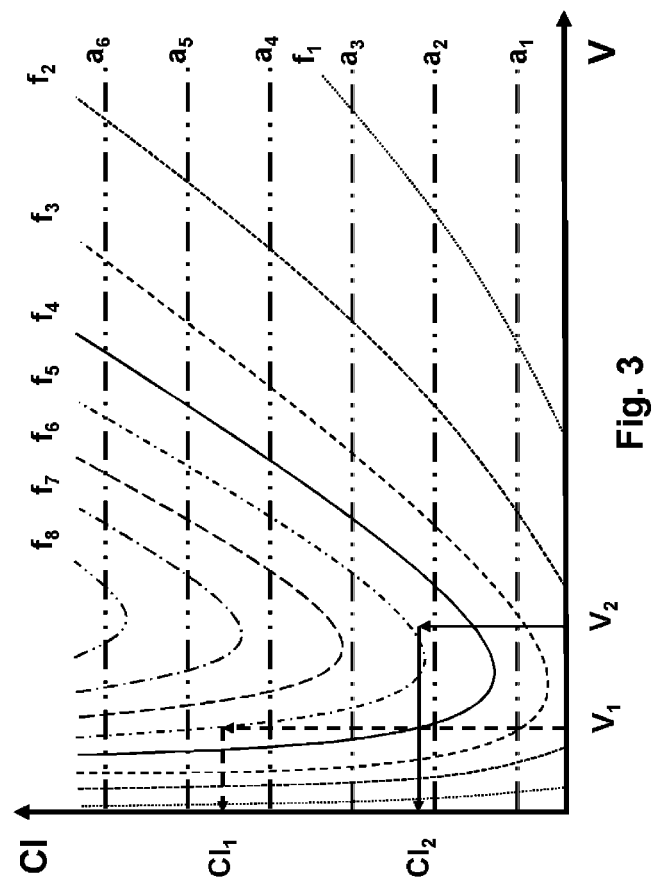
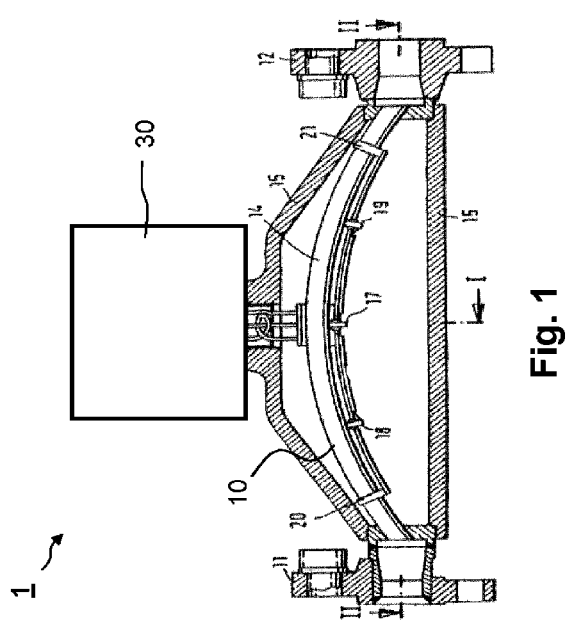
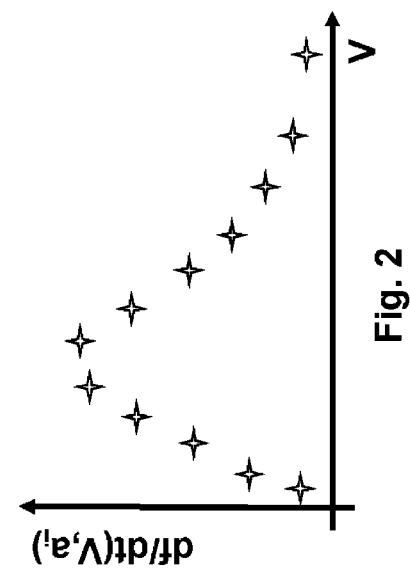
Fig. 1
Fig. 2
Fig. 3

MEASURING DEVICE AND METHOD FOR CHARACTERIZING A NON-HOMOGENEOUS, FLOWABLE MEDIUM

CROSS-REFERENCE TO RELATED APPLICATIONS

The present application is related to and claims the priority benefit of German Patent Application No. 10 2019 003 075.3, filed on Apr. 30, 2019, and International Patent Application No. PCT/EP2020/059050, filed on Mar. 31, 2020, the entire contents of which are incorporated herein by reference.

TECHNICAL FIELD

The present invention relates to a measuring device for characterizing an inhomogeneous, flowable medium, especially, for determining the density, the mass flow rate, and/or the viscosity of an inhomogeneous flowable medium and for characterizing the inhomogeneity of the medium, wherein the measuring device has at least one oscillator to which the medium can be applied and which has at least one oscillation mode whose natural frequency depends on the density p of the medium. Such an oscillator may comprise a single, oscillatory measuring tube or one or more pairs of oscillatory measuring tubes for conducting the medium.

BACKGROUND

Multi-phase media can have great inhomogeneities, especially, liquids loaded with gas, when the gas is not dissolved in the form of microbubbles in the liquid phase but is present in the form of free bubbles in the liquid phase. The presence of free bubbles may be a significant property of the medium, and its qualitative and/or quantitative determination may be of great interest. From the perspective of a measuring device through which an inhomogeneous medium flows, the inhomogeneities appear as density fluctuations dρ/dt. The latter cause fluctuations in the oscillation frequency df/dt of the oscillator, which correlate with the density fluctuation dρ/dt. Analysis of the fluctuations in the oscillation frequency df/dt of the oscillator accordingly offers an approach for analyzing density fluctuations and thus an indication of the degree of inhomogeneity of the medium. Aspects in the interpretation of frequency fluctuation, especially, regarding the comparability of data from different measuring sensors, are described in the as yet unpublished patent application DE 10 2018 112 002.8. The present invention relates firstly to another aspect for interpreting frequency fluctuations.

SUMMARY

An inhomogeneous density distribution in a medium is firstly a spatial phenomenon, which can only be observed as a temporal phenomenon when the medium flows past an observation point. It is therefore the object of the present invention to provide a measuring device which takes this phenomenon into account in the interpretation of frequency fluctuations.

The object is achieved according to the invention by the measuring device according to independent claim 1.

The measuring device according to the invention for characterizing an inhomogeneous medium comprises:

an oscillator having at least one oscillatory measuring tube for conducting the medium, and having at least one oscillation mode whose natural frequency depends on the density of the medium;

an exciter for exciting the oscillation mode; at least one oscillation sensor for sensing oscillations of the oscillator; and an operation and evaluation circuit, which is designed to apply an excitation signal to the exciter, to capture signals from the oscillation sensor, to determine current values of the natural frequency of the oscillator and fluctuations of the natural frequency on the basis of the signals from the oscillation sensor, and to generate a media status message having a fluctuation-dependent media status value, which message furthermore depends on a measured flow rate value which characterizes the flow rate prevailing during the fluctuations.

In a development of the invention, the media status message contains, in addition to the media status value, an indication of the flow regime in which the media status value was determined. In one embodiment of this development of the invention, this indication of the flow regime comprises the measured flow rate value, or a range of values of the measured flow rate value.

In a development of the invention, the media status value is normalized with a normalization function that is dependent on the measured flow rate value.

In a development of the invention, the media status value is also a function of the measured flow rate value with which function a flow-rate dependence of the fluctuations is compensated.

In a development of the invention, the measured flow rate value comprises a flow velocity, a mass flow rate, a volume flow rate, or a Reynolds number; or a range indication of the aforementioned variables.

In a development of the invention, the media status value comprises a gas void fraction of the medium or a range of values for the gas void fraction.

In view of the variety of generic types of measuring devices available, it requires a great deal of effort to arrive at comparable findings with regard to the presence of free bubbles with different measuring device types. This usually requires series of measurements in which media containing free bubbles are applied to each measuring device, and the observed frequency fluctuation of the oscillator is captured as a function of the concentration of free bubbles or as a function of the GVF (gas void fraction). Subsequently to be implemented is an algorithm which relates the observed frequency fluctuation to the inhomogeneity of the medium, especially, of its gas void fraction.

In order to facilitate a comparison between data from different measuring devices, the media status value $Z_M$ is, according to a development of the invention, a function of the fluctuations in the natural frequency, wherein the function furthermore has a natural-frequency-dependent normalization. This means, for example, that a first fluctuation-dependent function $F_A(df/dt)$ is divided by a second natural-frequency-dependent function $F_B(f)$, i.e.: $Z_M = F_A(df/dt)/F_B(f)$. A media status value determined in such a way is normalized insofar as it enables a comparison of the media status values independently of the natural frequencies specific to different measuring devices, since the influence of the natural frequency on the media status value is eliminated.

In one embodiment of this development of the invention, the function is proportional to the fluctuation of the natural frequency and to the third power of the reciprocal of the natural frequency.

In one embodiment of this development of the invention, the function is furthermore proportional to a modal stiffness of the oscillator in the oscillation mode of the oscillator associated with the natural frequency. In one embodiment of this development of the invention, the function is proportional to the fluctuation of the natural frequency and to the reciprocal of the natural frequency.

In a development of the invention, the oscillator has at least one pair of oscillatory measuring tubes for conducting the medium.

In a development of the invention, the measuring device has two oscillators, which are independent of each other and each have a pair of measuring tubes, wherein the two oscillators each have different useful mode natural frequencies for a useful bending vibration mode.

In a development of the invention, the media status value comprises an index for classifying the medium, especially, for classifying it with regard to its gas load.

In a development of the invention, the operation and evaluation circuit is designed to assign an evaluation to a measured density value, to a measured mass flow rate value, and/or to a measured viscosity value, which evaluation depends on the media status value and indicates, for example, the degree of inhomogeneity of the medium.

BRIEF DESCRIPTION OF THE DRAWINGS

The invention is now described on the basis of the exemplary embodiments shown in the drawings. The following are shown:

FIG. 1 shows a schematic representation of a first exemplary embodiment of a measuring device according to the present disclosure;

FIG. 2 shows a diagram showing frequency fluctuations as a function of the flow velocity of an inhomogeneous medium; and FIG. 3 shows a diagram showing frequency fluctuation as a function of the flow velocity and of a minority concentration of an inhomogeneous medium.

DETAILED DESCRIPTION

The first exemplary embodiment of a measuring device 1 according to the invention shown in FIG. 1 comprises an oscillator 10 which comprises a pair of oscillatory measuring tubes 14 which are routed in parallel and extend between an inlet-end flange 11 and an outlet-end flange 12, wherein the flanges each comprise a flow divider or collector into which the measuring tubes 14 open. The flow dividers are connected to one another by a rigid housing 15 so that oscillations of the flow dividers accommodating the measuring tubes are effectively suppressed in the range of oscillation frequencies of useful bending vibration modes of the oscillator. The measuring tubes 10 are rigidly connected to an inlet-end node plate 20 and an outlet-end node plate 21, wherein the node plates define oscillation nodes of the oscillator 10 formed by the two measuring tubes 14, and thus largely define the frequencies of the useful bending vibration modes. The oscillator 10 is excited to oscillate by an electrodynamic exciter 17 acting between the two measuring tubes 14, wherein the oscillations are detected by means of two oscillation sensors 18, 19 capturing relative movements of the measuring tubes 14 with respect to each other. The exciter 17 is driven by an operation and evaluation circuit 30, the latter also capturing and evaluating the signals from the oscillation sensors in order to determine a measured density value and possibly a measured mass flow rate value.

According to the invention, the operation and evaluation circuit 30 is also designed to determine and signal density fluctuations on the basis of the frequency fluctuations.

By means of a density meter that has an oscillator with at least one oscillatory measuring tube for conducting the medium, the density $\rho$ of a medium can be determined on the basis of a mode-specific, density-dependent natural frequency $f_i$ of the oscillator according to:

$$\rho(f_i) = c_{0,i} + \frac{c_{1,i}}{f_i^2}$$

The coefficients $c_{0,i}$ and $c_{1,i}$ are mode-specific coefficients, which are preferably to be determined for each measuring device type or for each measuring device. The coefficient $c_{0,i}$ is characterized by the mass of the measuring tube conducting the medium, while the coefficient $c_{1,i}$ depends on a mode-specific stiffness of the measuring tube. The time derivative of the density $$\frac{\partial \rho}{\partial t}$$

is thus given as:

$$\frac{\partial \rho}{\partial t} = c_{1,i} \frac{-2}{f_i^3} \frac{\partial f_i}{\partial t}.$$

The time derivative of the density $$\frac{\partial \rho}{\partial t}$$

is a suitable measure for describing the density fluctuation. In order to determine this value, the observed frequency fluctuation $$\frac{\partial f_i}{\partial t}$$

of the oscillating measuring tube or the oscillating measuring tubes also has to be multiplied by a normalization factor $$\frac{c_{(1,i)2}}{f_i^3}.$$

In this way, the basis is created for an evaluation function which can describe the degree of inhomogeneity of the medium in the form of density fluctuations independently of the particular type of density meter or its size. In one embodiment of the invention, the operation and evaluation circuit 30 of a measuring device according to the invention is designed to carry out the density fluctuation on the basis of the frequency fluctuation by means of the above-de scribed normalization with the reciprocal of the of the third power of the mode-specific natural frequency:

$$\frac{\partial \rho}{\partial t} = c_{1,i} \frac{-2}{f_i^3} \frac{\partial f_i}{\partial t}.$$

The effect of the above normalization is explained using data for two Coriolis mass flow meters from the applicant's company, namely a Promass F50 and a Promass Q50, both of which have the function of a density meter. The observed natural frequency fluctuations $$\frac{\partial f_i}{\partial t}$$

differ by a factor of about 6.6 in the case of an aqueous medium with a gas load of 1% or 2%. After normalization with the normalization factor $$\frac{c_{(1,i)2}}{f_i^3},$$

this results in approximately the same value for the density fluctuation $$\frac{\partial \rho}{\partial t}.$$

A similar analysis of the density fluctuation $$\frac{\partial \rho}{\partial t}$$

is implemented in a second development of the invention. In this case, the operation and evaluation circuit is designed to determine the density fluctuation according to:

$$\frac{\partial \rho}{\partial t} = \frac{2(\rho - c_{0,i})}{f_i} \frac{\partial f_i}{\partial t}.$$

In order to provide the magnitude of the relative density fluctuation $$\frac{\frac{\partial \rho}{\partial t}}{\rho},$$

the operation and evaluation circuit is designed according to a third development of the invention to determine the magnitude on the basis of the relative frequency fluctuation $$\frac{\frac{\partial f_i}{\partial t}}{f_i}$$

according to:

$$\left|\frac{\frac{\partial \rho}{\partial t}}{\rho}\right| = 2\left(1 + \frac{|c_{0,i}|}{\rho}\right)\left|\frac{\frac{\partial f_i}{\partial t}}{f_i}\right|$$

If the density of the medium at a measuring point varies by only a few percent around a known value but is otherwise known from the value range, the relative density fluctuation can be estimated as a function of the relative frequency fluctuation using:

$$\left|\frac{\frac{\partial \rho}{\partial t}}{\rho}\right| \approx a_i \left|\frac{\frac{\partial f_i}{\partial t}}{f_i}\right|,$$

wherein $a_i$ is a measuring-point-specific or medium-specific and optionally mode-specific constant, provided a plurality of modes can be used for density measurement.

The described normalizations with the third power of the frequency for the density fluctuation or with the frequency itself for the relative density fluctuation are advantageous but not absolutely necessary for the implementation of the present invention. The focus of the present invention is the consideration of the flow velocity in the interpretation of frequency fluctuations, which is now explained by reference to FIGS. 2 and 3.

FIG. 2 schematically shows the course of the frequency fluctuations df/dt as a function of the flow velocity V for an inhomogeneous medium with the composition $a_i$ which can, for example, be a liquid with a solid load, a wet gas, or a liquid loaded with gas. The minority component in this case has, for example, a concentration of a few percent by volume. If V=0 or the medium is stationary, the medium in the flow meter has a constant density. Accordingly, no frequency fluctuations occur. With the onset of the flow, the measuring device is time-dependently subjected to variable locally inhomogeneous distributions of the components of the medium, which can be observed as density fluctuations, for example in the form of frequency fluctuations df/dt. At first, the frequency fluctuations df/dt increase with increasing velocity. However, if the velocity increases further, the mean density of a greater quantity of media is included in a measured frequency value so that local density fluctuations become less important. Accordingly, the frequency fluctuations df/dt become smaller again.

FIG. 3 shows a topographical representation in which frequency fluctuations df/dt are plotted over the flow velocity and a minority concentration. In order to create such a map, the frequency fluctuation can be captured as a function of the velocity V for each different minority component as of a particular inhomogeneous medium. In the present diagram, the minority concentration as increases as the index i increases, and may be, for example, i percent by volume. After an adequate database has been created, the frequency fluctuations df/di can be represented and modeled as a function of the velocity V and of the minority concentration $a_i$ for example, in the topographical representation selected here, wherein the lines $f_j$ in each case connect together points of the same frequency fluctuations df/dt, wherein the fluctuation $f_j$ increases as the index j increases.

In measuring mode, a composition index CI can then be assigned to a frequency fluctuation df/di as a function of the flow velocity V that results from an instantaneous mass flow rate and the current mean density of the medium. Depending on the flow velocity, two different composition indices $CI_1$ and $CI_2$ result for the same observed frequency fluctuation $f_5$, as shown in FIG. 3. The composition indices can have a different significance depending on the question or measuring task of a measuring point.

On the one hand, the composition index may correspond to the minority component $a_1$ or be a linear function of the minority component. This can be useful, for example, when the minority fraction $a_1$ is a process variable to be monitored or regulated, for example the solid fraction or the gas void fraction in a liquid.

On the other hand, the composition index may also correspond to exceeding a critical monitoring variable; for example, all frequency fluctuations that correspond to a minority concentration below $a_3$ would be mapped to a composition index $CI_2$, while all frequency fluctuations that correspond to a minority concentration above $a_3$ would be mapped to a composition index $CI_1$, with $CI_1$ corresponding to a critical state.

The composition indices CI are media status values within the meaning of the invention that are to be captured, communicated, or signaled in a suitable manner.

In a simpler embodiment of the invention, tuples of frequency fluctuations and associated velocities are output as media status values.

In the context of the discussion of FIGS. 2 and 3, frequency fluctuations df/dt were described. Naturally, prior to determining the media status value, these frequency fluctuations can be normalized with the third power of the oscillation frequency in order to determine the media status value on the basis of the density fluctuations. The same applies to the normalization described above at the oscillation frequency in order to determine the media status value on the basis of relative density fluctuations. Furthermore, the presentation in FIGS. 2 and 3 can also be made over the mass flow rate, the volume flow rate, or the Reynolds number instead of over the flow velocity V. Depending on the embodiment of the invention, the operation and evaluation circuit of the measuring device is designed to carry out the required calculations.

Finally, unlike what is shown in FIG. 1, the operation and evaluation circuit can also comprise a plurality of spatially separated modules. The media status values can also be calculated in a remote computing module to which the required raw data are transmitted, for example wirelessly.

The invention claimed is:

1. A measuring device for characterizing an inhomogeneous, flowable medium, and for determining the density, the mass flow rate, and/or the viscosity of the medium, comprising:
   an oscillator having at least one oscillatory measuring tube for conducting the medium, and having at least one oscillation mode whose natural frequency depends on the density of the medium;
   an exciter for exciting the oscillation mode;
   at least one oscillation sensor for sensing oscillations of the oscillator; and
   an operation and evaluation circuit, which is designed to apply an excitation signal to the exciter, to capture signals from the oscillation sensor, to determine current values of the natural frequency of the oscillator and fluctuations of the natural frequency on the basis of the signals from the oscillation sensor, and to generate a media status message having a fluctuation-dependent media status value, which message furthermore depends on a measured flow rate value which characterizes the flow rate prevailing during the fluctuations.

2. The measuring device according to claim 1, wherein the media status message contains, in addition to the media status value, an indication of the flow regime in which the media status value was determined.

3. The measuring device according to claim 2, wherein the indication of the flow regime comprises the measured flow rate value or a range of values of the measured flow rate value.

4. The measuring device according to claim 1, wherein the media status value is normalized with a normalization function that is dependent on the measured flow rate value.

5. The measuring device according to claim 1, wherein the fluctuations depend on the respective flow rate, wherein the media status value is furthermore a function of the measured flow rate value with which the flow rate dependency of the fluctuations is compensated.

6. The measuring device according to claim 1, wherein the measured flow rate value comprises a flow velocity, a mass flow rate, a volume flow rate, or a Reynolds number or a range indication of the aforementioned variables.

7. The measuring device according to claim 1, wherein the media status value comprises a gas void fraction of the medium or a range of values for the gas void fraction.

8. The measuring device according to claim 1, wherein the measuring device has two oscillators, which are independent of each other and each have a pair of measuring tubes, wherein the two oscillators each have different useful mode natural frequencies for a useful bending vibration mode.

9. The measuring device according to claim 1 wherein the media status value comprises an index for classifying the medium.

10. The measuring device according to claim 1, wherein the operation and evaluation circuit is designed to assign an evaluation to a measured density value, to a measured mass flow rate value, and/or to a measured viscosity value, said evaluation depending on the media status value and indicating, for example, the degree of inhomogeneity of the medium.

11. A measuring device for characterizing an inhomogeneous flowable medium, and for determining the density the mass flow rate, and/or the viscosity of the medium, comprising:
   an oscillator having at least one oscillatory measuring tube for conducting the medium and having at least one oscillation mode whose natural frequency depends on the density of the medium;
   an exciter for exciting the oscillation mode;
   at least one oscillation sensor for sensing oscillations of the oscillator; and
   an operation and evaluation circuit, which is designed to apply an excitation signal to the exciter, to capture signals from the oscillation sensor, to determine current values of the natural frequency of the oscillator and fluctuations of the natural frequency on the basis of the signals from the oscillation sensor, and to generate a media status message having a fluctuation-dependent media status value, which message furthermore depends on a measured flow rate value which characterizes the flow rate prevailing during the fluctuations;
   wherein the media status value is a function of the fluctuations in the natural frequency, wherein the function furthermore comprises a natural-frequency-dependent normalization;

wherein the function is proportional to the fluctuation of the natural frequency and to the third power of the reciprocal of the natural frequency.

12. The measuring device according to claim 11, wherein the function is proportional to the fluctuation of the natural frequency and to the reciprocal of the natural frequency.

13. The measuring device according to claim 12, wherein the oscillator has at least one pair of oscillatory measuring tubes for conducting the medium.

14. A measuring device for characterizing an inhomogeneous, flowable medium, and for determining the density the mass flow rate, and/or the viscosity of the medium, comprising:

an oscillator having at least one oscillatory measuring tube for conducting the medium, and having at least one oscillation mode whose natural frequency depends on the density of the medium;

an exciter for exciting the oscillation mode;

at least one oscillation sensor for sensing oscillations of the oscillator; and an operation and evaluation circuit, which is designed to apply an excitation signal to the exciter, to capture signals from the oscillation sensor, to determine current values of the natural frequency of the oscillator and fluctuations of the natural frequency on the basis of the signals from the oscillation sensor, and to generate a media status message having a fluctuation-dependent media status value which message furthermore depends on a measured flow rate value which characterizes the flow rate prevailing during the fluctuations;

wherein the media status value is a function of the fluctuations in the natural frequency, wherein the function furthermore comprises a natural-frequency-dependent normalization;

wherein the function is furthermore proportional to a modal stiffness of the oscillator at the oscillation mode of the oscillator associated with the natural frequency.

15. A measuring device for characterizing an inhomogeneous, flowable medium, and for determining the density, the mass flow rate, and/or the viscosity of the medium, comprising:

an oscillator having at least one oscillatory measuring tube for conducting the medium, and having at least one oscillation mode whose natural frequency depends on the density of the medium;

an exciter for exciting the oscillation mode;

at least one oscillation sensor for sensing oscillations of the oscillator; and an operation and evaluation circuit, which is designed to apply an excitation signal to the exciter, to capture signals from the oscillation sensor, to determine current values of the natural frequency of the oscillator and fluctuations of the natural frequency on the basis of the signals from the oscillation sensor, and to generate a media status message having a fluctuation-dependent media status value, which message furthermore depends on a measured flow rate value which characterizes the flow rate prevailing during the fluctuations;

wherein the media status value comprises a gas void fraction of the medium or a range of values for the gas void fraction wherein the media status value comprises an index for classifying the medium.

* * * * *